United States Patent [19]

Faust et al.

[11] 4,255,254

[45] Mar. 10, 1981

[54] DELAYED COUNTERWEIGHT VIBRATOR APPARATUS

[75] Inventors: Elbert R. Faust, Litchfield, Conn.; Stuart F. Faunce, Fanwood, N.J.

[73] Assignee: Faunce and Associates, Inc., Fanwood, N.J.

[21] Appl. No.: 95,431

[22] Filed: Nov. 19, 1979

[51] Int. Cl.³ .......................... B07B 1/44; B65G 27/20

[52] U.S. Cl. .......................................... 209/329; 74/61; 198/770; 209/367

[58] Field of Search .................... 198/766, 770; 74/61, 74/87; 209/366.5, 367, 329; 366/128; 173/49

[56] References Cited

U.S. PATENT DOCUMENTS

| | | | |
|---|---|---|---|
| 2,144,382 | 1/1939 | Lincoln et al. | 74/61 |
| 2,852,946 | 9/1958 | Petrin | 74/61 |
| 3,053,379 | 9/1962 | Röder et al. | 198/770 |
| 3,091,712 | 5/1963 | Galbraith | 74/61 X |
| 3,449,969 | 6/1969 | Dorris | 74/61 |
| 3,468,418 | 9/1969 | Renner | 74/61 X |

*Primary Examiner*—James L. Rowland
*Attorney, Agent, or Firm*—Kenneth P. Glynn

[57] ABSTRACT

An improved apparatus for vibrational conveyance, e.g., for sifting, cleaning or screening bulk or particulate material. The apparatus includes:

(a) a frame;
(b) a trough connected to said frame;
(c) a plurality of leaf-springs, each leaf-spring supporting said frame at one end and fixedly located at the other end, the leaf-springs having only one degree of freedom;
(d) bearings mounted on said frame;
(e) a plurality of eccentric counterweights journaled in said bearings to transmit primary forces to said frame to impart motion thereto, the counterweights being of equal masses and identical shapes with respect to their axes of rotation;
(f) a plurality of motors mounted on the frame adapted to independently rotate said counterweights at equal but opposite rotational velocities; and,
(g) a time delay relay circuit connected to the plurality of motors operable so as to delay starting of one or more motors so as to cause the counterweights to start in a sequential manner and to thereby rotate the counterweights at a predetermined, synchronized phase angle.

10 Claims, 7 Drawing Figures

DELAYED COUNTERWEIGHT VIBRATOR APPARATUS

BACKGROUND OF THE INVENTION

1. Field of the Invention

The present invention is directed to a vibrator apparatus and is more particularly directed to an apparatus for vibrational conveyance employing eccentric counterweights being driven independently by motors with the system being synchronized at the desired phase angle by a time delay relay circuit.

2. Prior Art Statement

In the early development of apparatus for vibrational conveyance, such as vibrating screens and oscillating conveyors, what was known as brute-force type drives were employed. These were drives which did not operate at or near the natural frequency of the vibrating system of which the apparatus functional parts, e.g., screen, formed a part. The brute-force drives employed a circular motion-providing mechanism to achieve directional movement and required rugged, heavy duty construction of the apparatus as well as the use of high power motors.

Subsequently, vibrating apparatus were imparted motion by the use of rotating eccentric counterweights operating at or near the natural frequency of the apparatus. During startup of such mechanisms, out of phase rotation would initially occur due to the free hanging, out of place, prestart position of the counterweights. While this created an irregular and rough initial vibration, often not readily perceptible, it was observed that the counterweights "fell into synchronization" and, after initial operation, ran smoothly. This is illustrated, for example, in U.S. Pat. Nos. 2,144,382; 3,468,418 (col. 4, line 67 et seq.); 3,053,379 (e.g., col. 2 line 49 et seq., col. 3, line 8 et seq., col. 4, line 17 et seq., col. 4, line 41 etc.).

Notwithstanding the self-adjusting aspects of eccentric counterweight rotation, it became recognized that wear and tear on the apparatus was caused, in part, by slight out-of-phase operation of the counterweights in some systems. As pointed out in U.S. Pat. No. 3,449,969, the prior art apparatus was then designed with synchronized counterweights held in a fixed relative angular relationship. Such devices had independent drive motors but had their rotating members interconnected by gears, chains and equivalent mechanical elements to positively cause the rotating means and the shafts on which they are mounted, to rotate at the same speed and in predetermined angular relationship. While these devices constituted the state of the art and remain in use today, they do require the addition of unnecessary bulk (gears, chains, etc.), increased cost, expensive maintenance and generate frictional heat in the operation, especially when members are rotated at very high rates to produce high frequency vibrations.

U.S. Pat. No. 3,449,969 describes a mechanism for overcoming the foregoing problems to some extent. The patent illustrates the use of electromagnetic forces to synchronize the rotation of eccentric weights and points out that this mechanism assures synchronization during operation. It is also indicated that no two high speed motors will rotate at exactly the same r.p.m. and have exactly the same friction characteristics, field losses, and, thus, a variable speed resistor may be used with one or both motors for manual adjustment of rotational velocity.

While the invention of U.S. Pat. No. 3,449,969 overcomes the problems of bulk weight, lubrication, maintenance and heat of friction of geared or chained counterweights, and still maintains synchronized rotation, the invention fails to overcome one of the most important causes of wear and tear on a vibrational apparatus-namely, out-of-phase initial start-up. This causes minimal problems with devices arranged with suspension having three degrees of freedom, some problems with two degrees of freedom suspension and, more problems with single degree of freedom suspension systems. The proposition that the U.S. Pat. No. 3,449,969 invention does not overcome initial out-of-phase starting problems is supported by the patent itself at column 4, line 54 et seq., indicating a slow "shift" of the magnets into synchronization. It is not until this shift is completed that "absolute" synchronization is achieved.

In summary, the prior art does not teach or render obvious a simplified, low weight, low maintenance, non-heat producing, non-mechanical mechanism for avoiding out-of-phase start-up problems. Indeed, it is not even clear from the prior art that there has been a proper identification of the problem or cause of certain wear and tear on this type of apparatus, much less the particular solution to that problem described herein.

BRIEF DESCRIPTION OF THE PRESENT INVENTION

The present invention is directed to an improved apparatus for vibrational conveyance, e.g., for sifting, cleaning or screening bulk or particulate material. The apparatus includes:

(a) a frame;

(b) a trough connected to said frame;

(c) a plurality of leaf-springs, each leaf-spring supporting said frame at one end and fixedly located at the other end, said leaf-springs having only one degree of freedom;

(d) bearings mounted on said frame;

(e) means journaled in said bearings to transmit primary forces to said frame to impart motion thereto, said means including a plurality of eccentric counterweights being of equal masses and identical shapes with respect to their axes of rotation;

(f) a plurality of motors mounted on said frame adapted to independently rotate said counterweights at equal but opposite rotational velocities; and, (g) a time delay relay circuit connected to said plurality of motors operably so as to delay starting of one or more motors so as to cause said counterweights to start in a sequential manner and to thereby rotate said counterweights at a predetermined, synchronized phase angle.

DETAILED DESCRIPTION OF THE PRESENT INVENTION AND THE DRAWINGS

Figure 1:
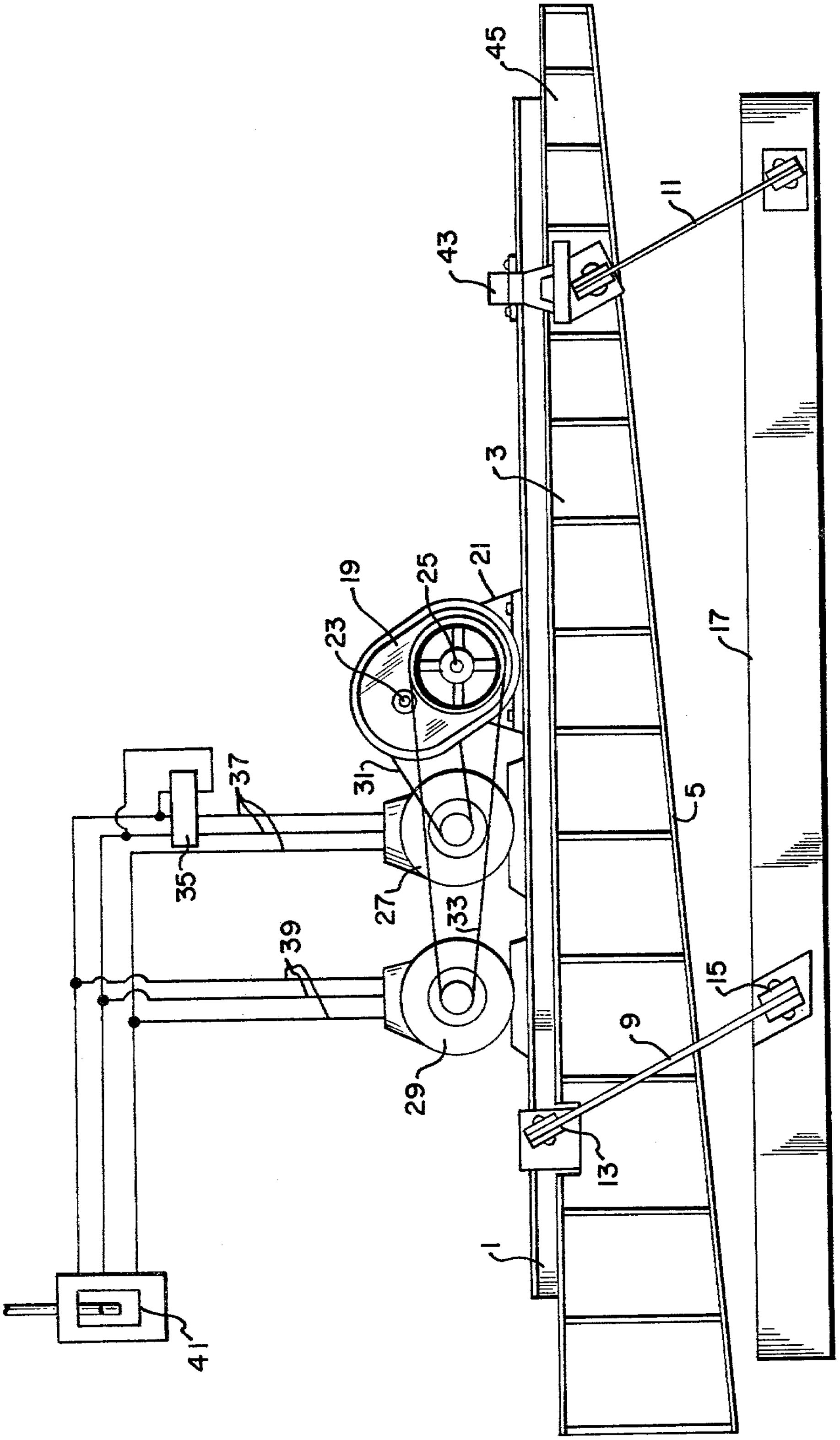
FIG. 1 illustrates a side view of a preferred embodiment apparatus of the present invention.

In FIG. 1, a side view of a preferred embodiment of the present invention is shown wherein frame 1 consitutes a horizontal I-beam type chassis. Trough 3 is connected to frame 1 by nuts and bolts (not shown) and contains incline 5 toward one end thereof so as to facilitate drainage via on open end. A plurality of leaf-springs, as exemplified by leaf-spring 9 and leaf-spring 11, support said frame 1 at one end and are fixedly located at the other end. For example, end 13 of leaf-spring 9 supports frame 1 and end 15 of leaf-spring 9 is fixedly located on beam 17 which is bolted to the floor (not shown). These leaf-springs are not coiled of freely suspended and, as illustrated, have only one degree of freedom, i.e., can only move back and forth in a single path which is substantially linear. Although the path for springs such as these is somewhat curved, the radius of curvature is much larger than the length of the path and the resultant movement is substantially linear.

Figure 2:
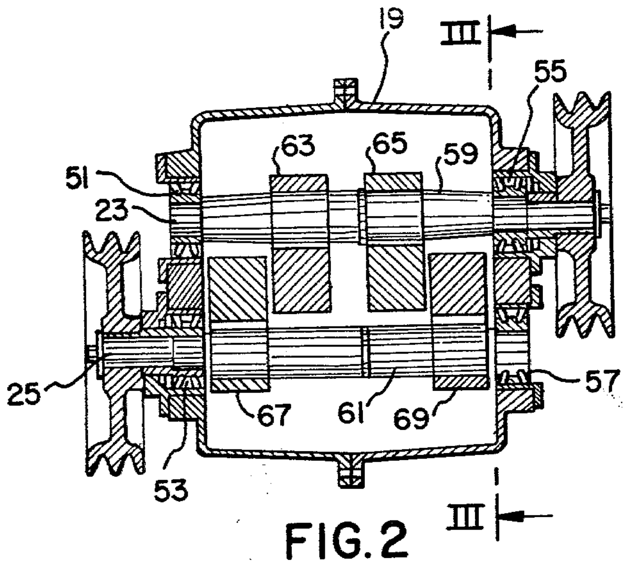
FIG. 2 is a central longitudinal cross section of the means employed to impart primary forces in the apparatus of FIG. 1 taken along the line II—II of FIG. 3.

Bearings contained within housing 19 are mounted on said frame via housing 19 and bracket 21. These bearings are illustrated in FIG. 2. Means 23 and 25 are journaled in said bearings and are arranged so as to transmit primary forces to frame 1 to impart motion thereto. These means are also illustrated in FIG. 2.

Motors 27 and 29 are mounted on frame 1 and are adapted to independently rotate the above-mentioned means 23 and 25 at equal but opposite velocities. In this example, the means 23 and 25 are driven by motors 27 and 29 via belts 31 and 33, respectively. A time delay relay circuit 35 is connected to the power input lines 37 and 39 of motors 27 and 29, these being connected from power source 41 to side by side motors. Time delay relay circuit 35 may be of any conventional time delay circuitry which will delay input power to one of the motors for a predetermined time after the other motor is started so as to cause means 23 and 25 to start in a sequential manner so as to rotate at a predetermined, synchronized phase angle.

Shock mounts exemplified by 43 in FIG. 1, are employed at the discharge end of trough 3 on the leaf-springs. In this illustration, shock mount 43 is employed in conjuction with leaf-spring 11 at the end of trough 3 wherein material is discharged from trough 3 at discharge end 45.

Figure 3:
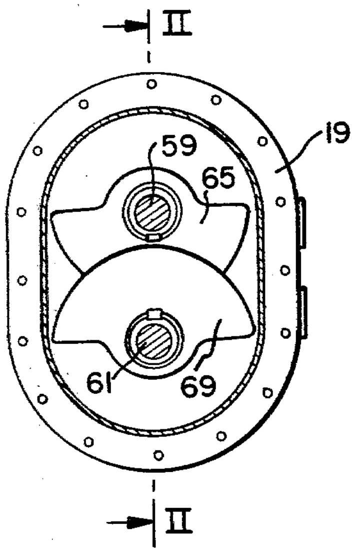
FIG. 3 is a transverse sectional view of the same means taken along line III—III of FIG. 2; and, FIGS. 4, 5, 6 and 7 show four successive views of the same mechanism, including resultant force vectors.

FIGS. 2 and 3 illustrate sectional views of housing 19 of FIG. 1, and its workings. Thus, FIG. 2 is a central longitudinal cross-section of the means employed to impart primary forces in the apparatus of FIG. 1 taken along the line II—II in FIG. 3. FIG. 3 is a transverse sectional view of the same means taken along the line III—III of FIG. 2. Like parts are like numbers and the two Figures are discussed together.

Housing 19 contains bearings 51, 53, 55 and 57. Means 23 and 25 are journaled in these bearings as shown. Means 23 and 25 comprise various parts including shafts 59 and 61, as well as eccentric counterweights 63, 65, 67 and 69.

In FIG. 2, four eccentric counterweights are shown with 63 and 65 being countered to 67 and 69. Additionally, the sum of counterweights 63 and 65 is equal in mass and shape (with respect to their axes of rotation). Although two sets of two each counterweights are shown, more sets identical or non-identical but equal may be used or, as shown in FIG. 3, a single set of two may be employed.

The functional aspects will now be described with reference to FIGS. 1, 2 and 3.

Motor 29 is stated with electric power and, via belt 33, rotates means 25, including shaft 61 and counterweights 67 and 69. The velocity is approximately 800 RPMs. Time delay relay circuit 35 delays power to motor 27 for a predetermined amount of time, in this case about 50 thousands of a second, and then starts motor 27. Via bet 31, motor 27 rotates means 23 including shaft 59 and counterweights 63 and 65. The time delay is predetermined so as to cause counterweights 67 and 69 and then 63 and 65 to start in such a sequential manner as to be thereby rotated in a predetermined, synchronized phase angle.

Figures 4, 5, 6, 7:
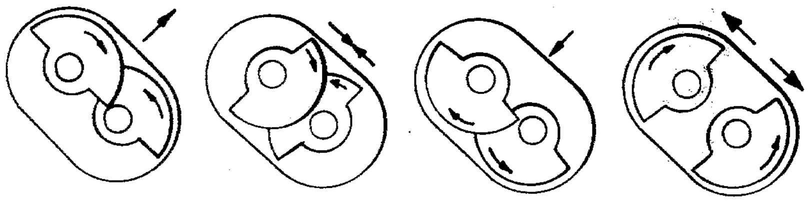

The results are illustrated in FIGS. 4 through 7, respectively. In this preferred embodiment illustration, the counterweights are rotated so as to impart forces in an equal and identical adding manner in a non-horizontal plane and in an equal and opposite cancelling manner is a non-vertical plane. Thus, in FIGS. 4 through 7 the housing is positioned in a 135° angle with the horizontal plane. In FIG. 4, the counterweights are imparting equal and identical forces radially so as to create an additive vector at about 45° to the horizontal phase. In FIG. 5, the counterweights are now imparting equal but opposite radial forces so as to cancel one another. In FIG. 6, the counterweights are again imparting equal and identical radial forces to create an additive force vector at about 225° to the horizontal phase. Lastly, in FIG. 7, the counterweights are equal and opposite in force and cancel one another.

Having now been explained with respect to the above specific examples, the full scope of variables and substituents should now be apparent to the artisan without exceeding the scope of the present invention.

The apparatus of the present invention as described above may be employed in any operation wherein it is desired to convey objects from one point to another in a vibrating fashion. Thus, the apparatus of the present invention may be employed to sift or screen particulate material wherein material larger than the mesh size of the screen would not pass through the screen but would vibrate along the screen to a first receptacle and wherein the particulate material which passes through the screen will be vibrated and conveyed along the bottom of the trough into a screen receptacle. Alternatively, the apparatus may be employed for conveying objects through fluids such as, for example, for the conveyance of machine parts through cleaning fluids. Other applications should now be apparent.

What is claimed is:

1. An apparatus for vibrational conveyance, comprising:

(a) a frame;

(b) a trough connected to said frame;

(c) a plurality of leaf-springs, each leaf-spring supported said frame at one end and fixedly located at the other end, said leaf-springs having only one degree of freedom;

(d) bearings mounted on said frame;

(e) means journaled in said bearings to transmit primary forces to said frame to impart motion thereto, said means including a plurality of eccentric counterweights being of equal masses and identical shapes with respect to their axes of rotation;

(f) a plurality of motors mounted on said frame adapted to independently rotate said counterweights at equal but opposite rotational velocities; and (g) a time delay relay circuit connected to said plurality of motors operable so as to delay starting of one or more motors so as to cause said counterweights to start in a sequential manner and to thereby rotate said counterweights at a predetermined, synchronized phase angle.

2. The apparatus of claim 1 wherein said trough contains screening means for selective vibrational conveyance of particulate material.

3. The apparatus of claim 1 wherein said plurality of eccentric counterweights comprises two eccentric counterweights and wherein said plurality of motors comprises two motors.

4. The apparatus of claim 1 wherein said trough includes an incline towards the discharge end to control material flow therethrough.

5. The apparatus of claim 4 further comprising shock mounts on said leaf-springs at the discharge end of said trough.

6. The apparatus of claim 1 wherein said time delay relay circuit is connected to said plurality of motors so as to delay starting of one or more motors so as to cause said counterweights to start in a sequential mannner and to thereby rotate said counterweights so as to impart forces in an equal and identical adding manner in a non-horizontal phase and in an equal and opposite cancelling manner in a non-vertical phase.

7. The apparatus of claim 2 wherein said time delay relay circuit is connected to said plurality of motors so as to delay starting of one or more motors so as to cause said counterweights to start in a sequential manner and to thereby rotate said counterweights so as to impart forces in an equal and identical adding manner in a non-horizontal phase and in an equal and opposite cancelling manner in a non-vertical phase.

8. The apparatus of claim 3 wherein said time delay relay circuit is connected to said plurality of motors so as to delay starting of one or more motors so as to cause said counterweights to start in a sequential manner and to thereby rotate said counterweights so as to impart forces in an equal and identical adding manner in a non-horizontal phase and in an equal and opposite cancelling manner in a non-vertical phase.

9. The apparatus of claim 4 wherein said time delay relay circuit is connected to said plurality of motors so as to delay starting of one or more motors so as to cause said counterweights to start in a sequential manner and to thereby rotate said counterweights so as to impart forces in an equal and identical adding manner in a non-horizontal phase and in an equal and opposite cancelling manner in a non-vertical phase.

10. The apparatus of claim 5 wherein said time delay relay circuit is connected to said plurality of motors so as to delay starting of one or more motors so as to cause said counterweights to start in a sequential manner and to thereby rotate said counterweights so as to impart forces in an equal and identical adding manner in a non-horizontal phase and in an equal and opposite cancelling manner in a non-vertical phase.

* * * * *